Oct. 21, 1969   W. J. PLATE ET AL   3,474,189
ELECTRIC POWER CABLE
Filed Dec. 22, 1967

INVENTORS
W. J. PLATE
E. H. ARNAUDIN Jr.
BY V F Volk
THEIR AGENT

United States Patent Office 3,474,189
Patented Oct. 21, 1969

3,374,189
ELECTRIC POWER CABLE
Walter J. Plate, Rye, N.Y., and Edwin H. Arnaudin, Jr., Marion, Ind., assignors to Anaconda Wire and Cable Company, a corporation of Delaware
Filed Dec. 22, 1967, Ser. No. 692,893
Int. Cl. H01b *11/02, 7/00*
U.S. Cl. 174—115      4 Claims

ABSTRACT OF THE DISCLOSURE

An electric cable with a semiconducting outer jacket has undulatory drain wires buried in the jacket in line with the cable axis.

Background of the invention

In the distribution of electric power it has long been the practice to construct electric cables with a layer of semiconducting bedding tapes over the insulation, surrounded by copper shielding tapes, and protected by an abrasion resistant non-conducting jacket. It has also been known to use buried cables with semiconducting outer abrasive resistant jackets overwound with helical neutral or drain wires. In the manufacture of such cables a separate operation is required to apply the outer wires and the dameter of the cable is increased by their presence, while the drain wires themselves are exposed to corrosion.

We have invented a cable providing substantially all of the protection against abrasion of the known cables but with a reduced overall diameter and lower cost of manufacture. Reduction in the diameter of a cable is much to be desired because it permits longer lengths of continuous cable to be wound on a shipping reel, with a resulting reduction in the number of field splices required. Smaller cables also require less space in ducts and conduits with a resulting lowering of installation costs. The reduced cost of our cable stems from the omission of the operation of winding the drain wires. In known types of cable the drain wires had to be helically applied in order to be held onto the cable core and to permit the necessary flexibility that is required of cables that are wound on shipping reels.

Our invention, as will be more fully explained hereinbelow, also affords an increased protection against mechanical damage or penetration of the cable.

Furthermore, our cable affords more intimate contact and lower electrical resistance between the semiconducting cable jacket and the drain wires.

Summary of the invention

The cable of our invention comprises a conductor, a wall of insulation surrounding the conductor, a thick jacket of semiconducting polymeric material directly surrounding the wall of insulation, and a plurality of undulating drain wires imbedded, for at least a major portion thereof, in the jacket. The drain wires are laid substantially in line with the axis of the cable rather than being wrapped helically around it. In one embodiment the undulations of the drain wires are radial to the axis of the cable and in another embodiment they define the arc of a cylinder, and/or are adjacent to the outer surface of the jacket.

Our improved method of making a cable with drain wires comprises the step of continuously passing an insulated cable core through the die of an extruder wherein it is directly surrounded with a thick layer of semiconducting polymeric material. Concurrently we pay a plurality of drain wires through the die in spaced locations around the core whereby the drain wires are imbedded in the jacket. The jacket is then cooled, sealing in the drain wires and firmly attaching them to the cable.

Description of the preferred embodiment

Figure 1:
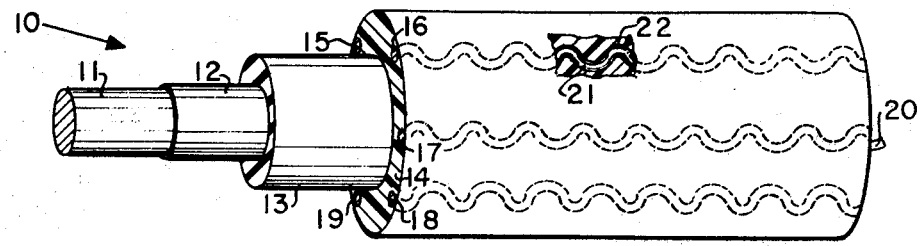
FIGURE 1 shows a pictorial view of a cable made to our invention.

Referring to FIGURE 1, a cable, indicated generally by the numeral 10 has a conductor 11, strand shielding 12 and wall of insulation 13 of known structure. The insulation 13 may, for example, be thermoplastic polyethylene, synthetic rubber, or cross-linked polyethylene but is not limited thereto. Directly over the insulation and in intimate contact with its surface at all points the insulation is surrounded by a thick jacket 14 of semiconducting polymeric material, which in the illustrated case is polyvinylchloride that has been rendered semiconducting in a known manner by the inclusion of conducting carbon black. Other polymeric materials suitable for the jacket stock of the cable of our invention include, but are not limited to, neoprene, polyethylene, and ethylene-propylene copolymer. Distributed evenly around the circumference of the cable 10, beneath the outer surface of the jacket 14, are six undulatory copper drain wires 15, 16, 17, 18, 19, 20 which can serve as neutral conductors and increase the electrical protection offered by the jacket 14. Because of the undulating shape that has been given to the drain wires 15–20 they do not decrease the flexibility of the cable 10 even though they are not wound helically around it in the usual manner but are laid in lines parallel to the cable axis. Although the illustrated wires are copper it will be appreciated that other metals or combinations of metals may also be used within the scope of our invention, and the fact that the drain wires are covered by the substance of the jacket 14 which protects them from corrosion will allow the use of aluminum in underground locations.

It will be appreciated that the contact resistance between the wires 15–20 and the substance of the jacket 14 is minimal and certainly much lower than the resistance between the jacket and wires applied helically over the outside. Such wires have only "line," rather than surface, contact with the jacket and this is reduced by differential expansion and by the imposition of foreign particles, particularly when the cable is buried.

The wires 15–20 in the embodiment of FIGURE 1 are located just beneath the surface of the jacket 14, with the undulations in planes normal to radii through the cable axis. In some cases it may be desired to have the wires 15–20 break through the surface at the ends of the loops of the undulations, such as the points 21, 22. This has the advantage of making the wires visible for purposes of grounding and of identifying the outer surface to be conducting rather than insulating. Where it is desired to protect the wires 15–20 more thoroughly from corrosion, they may be embedded further beneath the surface of the jacket 14 and still afford the benefits of our invention. One of these benefits, where the cables are buried, is protection from accidental penetration. The undulating disposition of the drain wire can be seen to cause it to protect a greater area, mechanically, than the same wire, helically applied. Electrically, also, the undulatory disposition of the drain wires reduces the maximum current path through the jacket material.

It is apparent, also, from a consideration of FIGURE 1 that the undulatory shape of the wires 15–20 provides slack for making connections so that a shorter area of cable must be stripped back to provide a length of wire for making a connection than is required where straight drain wires are helically applied.

Figure 2:
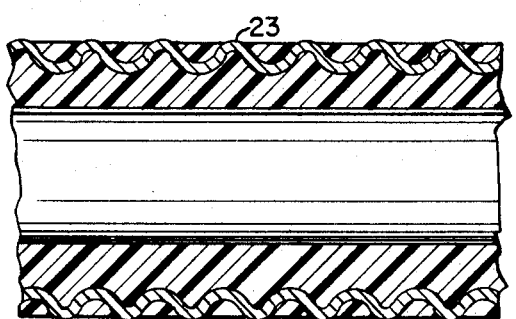
FIGURE 2 shows a partial section of a cable in one embodiment of our invention.

In the embodiment of FIGURE 2 the drain wires, of which wires 23 and 24 can be seen, are disposed with their undulations radial to the cable. In this configuration the surface of the jacket may be broken, as shown, by permitting a portion less than a thickness of the wires 23, 24 to extend periodically above the surface where it will be visible.

Figure 3:
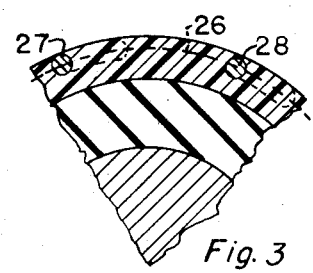
FIGURE 3 shows a pictorial view of a section of cable made to another embodiment of our invention.

In the embodiment of FIGURE 3 the drain wires have been undulated in arcs of an imaginary cylinder 26 around the cable axis. By this means a line of each of drain wires 27, 28 can be tangent to the surface of the jacket without breaking the smooth circular section of the cable. Where a plurality of cables are installed in a duct from which one cable may be withdrawn a smooth outer surface provides the least chance of snagging or interlocking of the cable surfaces and this is provided by the construction of FIGURE 3 with the maximum area of drain wire adjacent to the surface.

As an example of our invention a cable was constructed to the following dimensions:

Diameter, mils
Core consisting of stranded copper conductor, semiconducting strand shielding, and cross-linked polyethylene insulation _____ .890
Jacket—semiconducting PVC _____ 1.050
Drain wires—6 of #19 A.W.G., copper—have undulations between crests of 0.22 inch and a total breadth of .15 inch.

The precise dimensions of the corrugations of the drain wires are not critical except that the breadth and frequency of the corrugations should be sufficient to allow the cable to bend. In any event, satisfactory corrugations can be sealed from those of the example for cables of different dimensions. Neither is it necessary that each of the drain wires should consist of a single filamentary strand, two or more parallel or even crossing strands being serviceable, provided each of them is undulatory.

Figure 4:
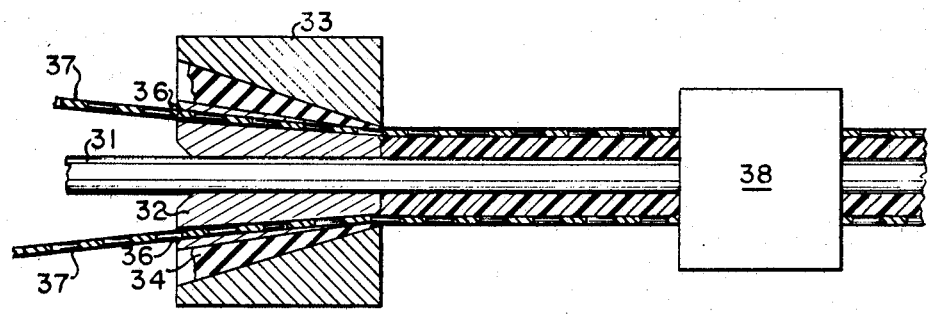
FIGURE 4 illustrates the steps of the method of our invention.

Referring now to FIGURE 4 a method of making our cable at high speed and reduced cost comprises the step of paying a cable core 31 through a core tube 32 within an extruder head, of which many suitable types are known and the details of which are not shown. The core tube pays into a die 33 within which the core is subjected to the step of being covered with jacketing compound 34 fed by elements of the extruder, not shown, under high pressure. The core tube 32 has a plurality of lengthwise slots 36 into which are paid a like plurality of drain wires 37 which have been given the desired undulatory shape. By this method of manufacture the drain wires are applied during the extrusion operation at extrusion speeds and the wires are securely embedded in the semiconducting jacket. Upon leaving the die 33 the cable passes through a cooling apparatus 38, such as a water trough, where the jacket is subjected to a cooling step where it solidifies. Where it is desired to vulcanize the jacket there may be an intermediate heating step between the die and the cooler 38.

We have invented a new and useful cable and method, of which the foregoing description has been exemplary rather than definitive, and for which we desire an award of Letters Patent.

We claim:
1. An electric power cable comprising
 (A) a conductor,
 (B) a wall of insulation surrounding said conductor,
 (C) a thick jacket of semiconducting polymeric material directly surrounding said wall of insulation, and
 (D) a plurality of undulatory drain wires imbedded, for at least a major portion thereof, in said jacket substantially in line with the axis of said cable.

2. The cable of claim 1 wherein the undulations of said drain wires are radial to the axis of said cable.

3. The cable of claim 1 wherein the undulations of said drain wires define the arc of a cylinder.

4. The cable of claim 1 wherein said drain wires are adjacent to the outer surface of said jacket.

References Cited

FOREIGN PATENTS

| 1,075,332 | 4/1954 | France. |
| 641,922 | 8/1950 | Great Britain. |
| 813,151 | 5/1959 | Great Britain. |

OTHER REFERENCES

"URD Hardware Excites Britons at Edinburgh," in Electrical World, Nov. 27, 1967, pp. 42 and 100.

E. A. GOLDBERG, Primary Examiner

U.S. Cl. X.R.
174—102